W. E. L. HARBOUR.
HITCH FOR TWO-WAY PLOWS.
APPLICATION FILED JULY 31, 1917. RENEWED MAY 18, 1918.
1,281,357.
Patented Oct. 15, 1918.
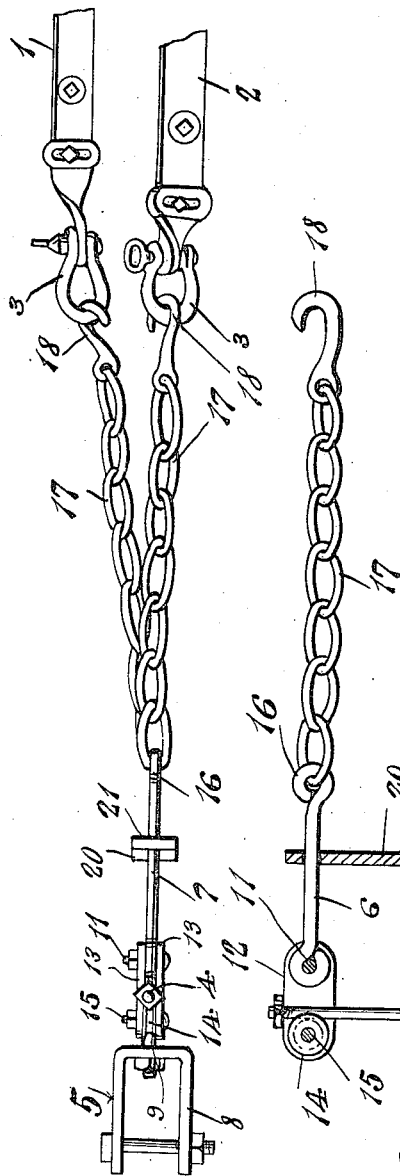
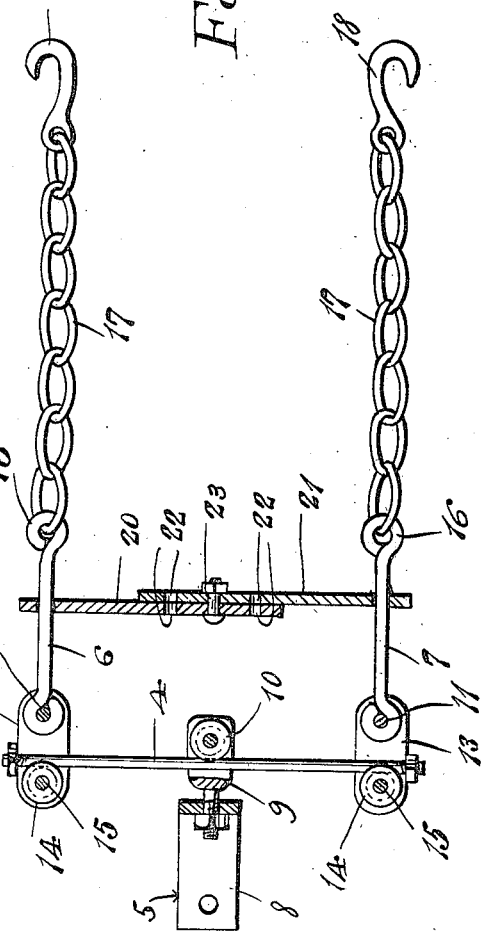

UNITED STATES PATENT OFFICE.

WILLIAM EDMOND LEE HARBOUR, OF EATON, COLORADO.

HITCH FOR TWO-WAY PLOWS.

1,281,357.  Specification of Letters Patent.  Patented Oct. 15, 1918.

Application filed July 31, 1917, Serial No. 183,726. Renewed May 18, 1918. Serial No. 235,387.

*To all whom it may concern:*

Be it known that I, WILLIAM EDMOND LEE HARBOUR, a citizen of the United States, residing at Eaton, in the county of Weld and State of Colorado, have invented certain new and useful Improvements in Hitches for Two-Way Plows; and I do hereby declare the following to be a full, clear, and exact description of the invention, such as will enable others skilled in the art to which it appertains to make and use the same.

This invention relates to a hitch for two way sulky plows, and the primary object of the invention is to provide a hitch which is constructed for allowing free adjustment and eliminating binding or side pulling, consequently decreasing the draft of the plow and also to provide flexible means for connection with the front end of the beams of the plow bottom so as to permit the rocking of the beams without binding or cramping of the hitch during the adjustment of the plows.

Another object of this invention is to provide a hitch as specified which specifically includes a swiveled clevis having a roller associated therewith which engages a rod so as to allow free movement of the clevis, which is attached to the draft evener upon the rod and also to mount a pair of rods upon suitable roller carrying plates, the rollers of which plates engage the first named rod for supporting the direct hitching rod so as to allow of free pivotal and slidable movement of the rod and further to connect chains to the hitching rods, which chains are connected to the clevises carried by the plow bottom beams, thereby permitting of a free and unimpeded movement of the beams during adjustment.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which—

Figure 1 is a side elevation of the improved hitch structure showing the same attached to the front ends of the beams of an ordinary two way plow, and Fig. 2 is a horizontal section through the hitch structure.

Referring more particularly to the drawings, 1 and 2 indicate the front ends of the beams of an ordinary two way sulky plow, which have clevises 3 of the usual construction connected thereto.

The hitch structure includes a rod 4 which extends transversely to the direction of travel of the plow and forms a support or coupling member for the draft tree clevis 5 and the hitching rods 6 and 7. The clevis 5 comprises the usual U-shaped strap 8 of iron which engages and is attached to the draft tree, which U-shaped strap 8 is connected, to a metal strap 9, which rotatably supports a roller 10. The roller 10 preferably has a concave periphery and it engages the rod 4, as clearly shown in Fig. 2 of the drawings so as to allow lateral movement of the clevis structure 5 upon the rod 4.

The hitch rods 6 and 7 are pivotally connected as shown at 11 to straps 12 and 13 respectively which strips support rollers 14. The rollers 14 are rotatably mounted upon pins 15 carried by the straps 12 and 13 and they engage the rod 4 upon the opposite side of the rod from the roller 10, they being provided to permit of a limited free movement of the straps 12 and the hitch rods 6 and 7 upon the rod 4.

The hitch rods 6 and 7 have eyes 16 formed upon their rear ends to which eyes are connected chains or flexible members 17. The chains or flexible members 17 have hooks 18 attached to their rear free ends which hooks are connected to the clevises 3. The rods 6 and 7 have bars 20 and 21 respectively loosely mounted thereon, which bars are provided with a plurality of spaced openings 22, which are adapted to aline, and any alining pair of which receives a bolt 23. The bolt 23 connects the bars 20 and 21 and consequently connects the rods 6 and 7 so as to maintain them in proper spaced relation during operation. The pivotal connection at 11, of the rods 6 and 7 and the rollers 14 engaging the rod 4 will permit of sufficient movement of the hitch rods 6 and 7 independently of each other, so as to prevent binding or cramping of the hitch during the adjustment of the plow and also allow them to coact with the clevis structure 5 for eliminating side draft on the plow during operation, while the flexible member 17 will permit of free and unimpeded adjustable movement of the beams 1 and 2.

In reducing the invention to practice, certain minor features of construction, combination and arrangement of parts may necessitate alterations to which the patentee is entitled provided such alterations are comprehended within the scope of what is claimed.

What is claimed is:—

1. In a hitch for two way plows, a rod, a draft tree clevis adjustably carried by said rod for movement laterally of the direction of travel of the plow, a pair of hitch rods adjustably connected to said first named rod for adjustment laterally of the direction of travel of the plow, flexible members attached to the rear ends of said hitch rods and adapted for connection with plow beams, and a pair of bars carried by said hitch rods and having their ends overlapping and adjustably connected for maintaining the hitch rod in proper spaced relation.

2. A hitch for two way sulky plows comprising a rod extending transversely in the direction of travel of the plow, a draft tree clevis adjustably carried by said rod for free movement longitudinally along the rod, a pair of straps, rollers carried by said straps and engaging said rod, a pair of hitch rods pivotally connected to said straps, a flexible chain connected to the free end of each of said hitch rods, hooks carried by the free ends of said chain.

3. A hitch for two way sulky plows comprising a rod extending transversely in the direction of travel of the plow, a draft tree clevis adjustably carried by said rod for free movement longitudinally along the rod, a pair of straps, rollers carried by said straps and engaging said rod, a pair of hitch rods pivotally connected to said straps, a flexible chain connected to the free end of each of said hitch rods, hooks carried by the free ends of said chain, a bar loosely mounted upon each of said hitch rods and provided with a plurality of spaced openings formed in its free end, said bars having their perforated ends overlapping, and a bolt extending through an alining pair of said openings for connecting said bars for connecting said hitch rods to hold them in proper spaced relation.

In testimony whereof I affix my signature in presence of two witnesses.

WILLIAM EDMOND LEE HARBOUR.

Witnesses:
D. K. MAJOR,
M. L. BROWN.

Copies of this patent may be obtained for five cents each, by addressing the "Commissioner of Patents, Washington, D. C."